US009747813B2

(12) United States Patent
Schramm et al.

(10) Patent No.: US 9,747,813 B2
(45) Date of Patent: Aug. 29, 2017

(54) BRAILLE MIRRORING (75) Inventors: Karl Schramm, San Jose, CA (US); Eric Taylor Seymour, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1543 days.

(21) Appl. No.: 12/617,672

(22) Filed: Nov. 12, 2009

(65) Prior Publication Data
US 2011/0111376 A1 May 12, 2011

(51) Int. Cl.
G09B 21/00 (2006.01)
G09B 5/08 (2006.01)

(52) U.S. Cl.
CPC ............. *G09B 21/003* (2013.01); *G09B 5/08* (2013.01)

(58) Field of Classification Search
CPC ................................ G09B 21/003; G09B 5/08
USPC .......... 434/113, 118, 350, 114; 715/702, 249
See application file for complete search history.

(56) References Cited

U.S. PATENT DOCUMENTS

| 6,083,270 | A  |   | 7/2000  | Scott |          |
|-----------|----|---|---------|-------|----------|
| 6,662,163 | B1 |   | 12/2003 | Albayrak et al. | |
| 6,738,951 | B1 | * | 5/2004  | Weiss et al. ................... | 715/249 |
| 7,216,298 | B1 | * | 5/2007  | Ballard et al. ................. | 715/760 |
| 2002/0003469 | A1 | * | 1/2002 | Gupta ........................ | 340/407.1 |
| 2002/0115051 | A1 | * | 8/2002 | Sanda ........................... | 434/350 |
| 2004/0225716 | A1 | * | 11/2004 | Shamir et al. ................ | 709/204 |
| 2005/0210030 | A1 | * | 9/2005  | Gordon et al. ................. | 707/10 |
| 2006/0261709 | A1 | * | 11/2006 | Kato et al. ..................... | 310/367 |
| 2007/0136334 | A1 | * | 6/2007  | Schleppenbach et al. ... | 707/101 |
| 2008/0110390 | A1 | * | 5/2008  | Peterson ....................... | 114/361 |
| 2008/0303645 | A1 | * | 12/2008 | Seymour et al. .......... | 340/407.2 |
| 2009/0017432 | A1 | * | 1/2009  | Hoffmann et al. ........... | 434/323 |
| 2009/0104587 | A1 | * | 4/2009  | Fabrick et al. ............... | 434/113 |
| 2009/0292999 | A1 | * | 11/2009 | LaBine et al. ................ | 715/740 |
| 2011/0111375 | A1 | * | 5/2011  | Luu et al. ..................... | 434/114 |

OTHER PUBLICATIONS

Chung, Jong-Moon et al., Virtual Laboratory Education for Persons With Vision Disabilities, 2002, IEEE.*
Kraus, Michael et al., an Off-Screen Model for Tactile Graphical User Interfaces, 2008, Human-Computer Interaction Research Group Technical University of Dresden, © Springer-Verlag Berlin Heidelberg.*
Yordanova, Korneliya, Meta-Data Application in Development, Exchange and Delivery of Digital Reusable Learning Content, 2007, Interdisciplinary Journal of Knowledge and Learning Objects, vol. 3.*

(Continued)

*Primary Examiner* — Nathan Hillery
(74) *Attorney, Agent, or Firm* — Blakely, Sokoloff, Taylor & Zafman LLP (57) ABSTRACT

Techniques for performing Braille mirroring are disclosed. In one aspect, content is converted into Braille content, and then formatted for each of a plurality of Braille displays. The formatted content is then sent to each of the Braille displays. In another aspect, data identifying a primary Braille display in a plurality of Braille displays is stored. Input requesting that a data processing apparatus perform an action is received from one of the Braille displays, and it is determined whether to perform the action, based in part on whether the requesting Braille display is the primary Braille display.

13 Claims, 6 Drawing Sheets

(56) References Cited

OTHER PUBLICATIONS

Anon, VoiceOver Getting Started, Sep. 24, 2009, Apple, Chapter 10, <http://www.apple.com/voiceover/info/guide/__1129.html>.*

Hanlon, Mike. "Touch Messenger Sends and Receives Text Messages in Braille" [online]. Jun. 16, 2006, 9 pages.

Jayasrikanthan, Y., Lipton, M. C., Mitchelmore, B. A., and Watts, T. H. "Academic Accessibility in Lectures," University of Guelph, Proceedings of the ENGG 3100: Design III projects, 2007, pp. 55-56.

Mirror Drivers, Windows Driver Kit: Display Devices [online], Oct. 1, 2009, msdn © 2009 Microsoft Corporation [retrieved on Nov. 12, 2009]. Retrieved from the Internet: http://msdn.microsoft.com/en-us/library/ms797878(printers).aspx.

Sablé, S., and Archambault, D. "Libbraille: a Portable Library to Easily Access Braille Displays," Lecture Notes in Computer Science, vol. 2398, Proceedings of the 8th International Conference on Computers Helping People with Special Needs, Jul. 2002, pp. 345-352.

Thibault, S., and Hinderer, S. "BrlAPI: Simple, Portable, Concurrent, Application-level Control of Braille Terminals" [online], Dans International Conference on Information and Communication Technology Accessibility (ICTA), Mar. 9, 2007, 6 pages. Retrieved from: http://arxiv.org/abs/cs/0703044v1.

* cited by examiner

BRAILLE MIRRORING

TECHNICAL FIELD

This subject matter is generally related to providing content to Braille displays.

BACKGROUND

Braille displays are commonly used to allow a visually disabled user to experience content generated by a computer. A user can also use his or her Braille display to interact with the computer. However, most computers only accommodate a single Braille display at a time.

SUMMARY

Techniques and systems for Braille mirroring are disclosed. These techniques can be used to send content presented on a host device to multiple Braille displays. The techniques can also be used to determine whether to respond to input received from a Braille display. In one aspect, content is received in a reference format, converted into Braille content, and separately formatted for each of a group of Braille displays, where at least two of the Braille displays have different formats. The formatted content is then sent to each of the Braille displays. In another aspect, data identifying a group of Braille displays and a primary Braille display is stored. First text corresponding to first content displayed on a display device is received, and formatted Braille content is sent to each of the Braille displays. In yet another aspect, data identifying a group of Braille displays and a primary Braille display is stored. Input requesting that a data processing apparatus perform an action is received from one of the Braille displays, and it is determined whether to perform the action, based in part on whether the requesting Braille display is the primary Braille display.

Particular embodiments of the subject matter described in this specification can be implemented to realize one or more of the following advantages. Multiple users can receive content from the same computer. Each user can receive the content through a Braille display configured to accommodate the user's needs or preferences. This allows students in a classroom, collaborators on a project, or audience members at a presentation to each experience content in a way best suited to their individual needs. Control of the computer can be monitored so that only a primary Braille display can control the computer, or all Braille displays can control the computer. This allows a single user to retain control of the computer when appropriate (e.g., when the user is teaching a classroom of students), and allows users to collaborate together when appropriate (e.g., when they are working on a collaborative project).

DETAILED DESCRIPTION

Example Applications of Braille Mirroring

Teaching Scenario

Figure 1A:
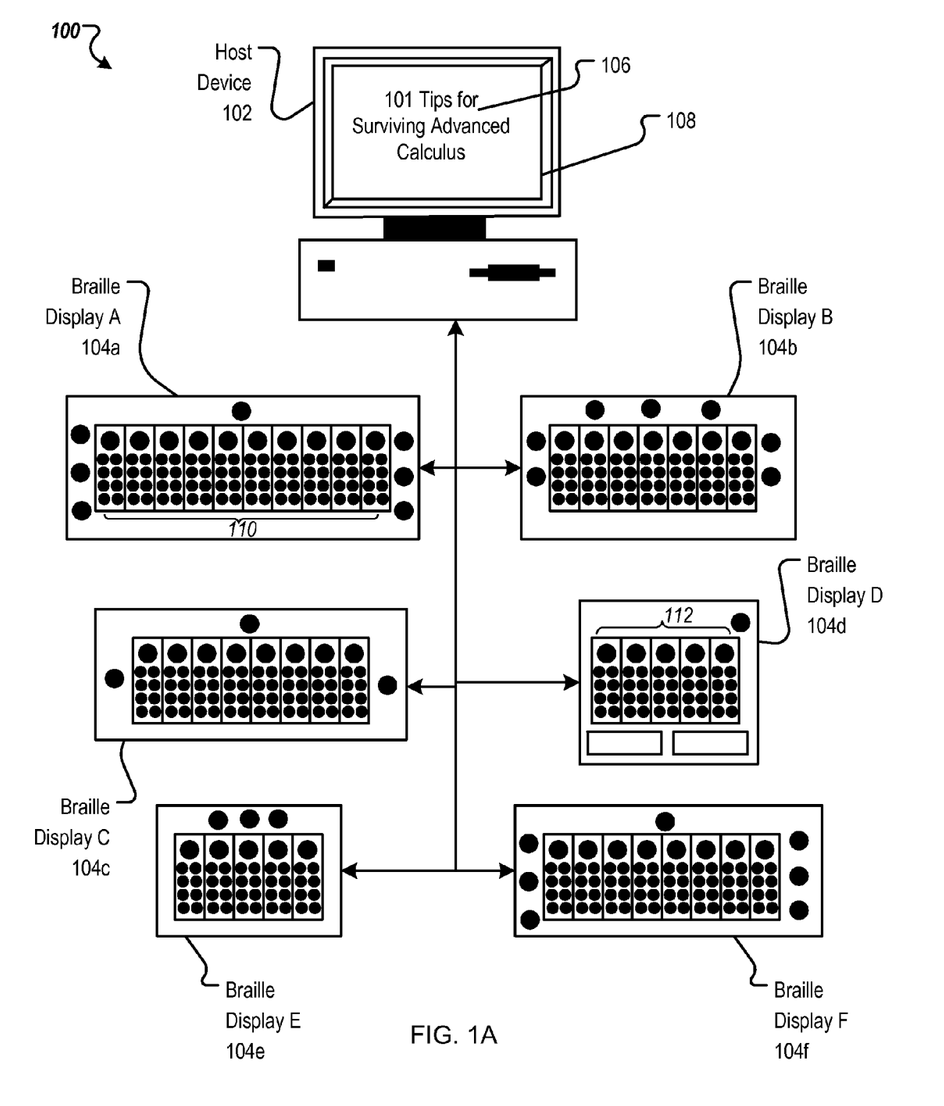
FIGS. 1A-1B illustrate overviews of example systems.

FIG. 1A illustrates an overview of an example system 100. The system 100 includes a host device 102 that is coupled to several Braille displays 104. Each Braille display, also known as a refreshable Braille display or Braille terminal, is a device that presents a tactile representation of Braille characters, e.g., by raising and lowering pins associated with cells on the Braille display. While six Braille displays are shown in FIG. 1A, any number of Braille displays, including more than six and less than six, can be connected to the host device 102. The Braille displays 104 can be physically coupled to the host device 102, or can be coupled by other means, for example through a wireless connection. Example physical connections include, but are not limited to, Universal Serial Bus (USB), Ethernet, and FireWire™ connections. Example wireless connections include, but are not limited to, RFID, Bluetooth™, wireless network, ultra wideband, z wave, and ZigBee™ connections.

The example below will be described in reference to a classroom setting. However, the system 100 can be used in a variety of other contexts, for example, meetings, conferences, and other places groups of people gather to receive information from a primary source. For example, the system can be used when a speaker is giving a computerized slide presentation to an audience of Braille users.

In the system 100, a teacher leading a classroom uses the host device 102. The teacher may control the host device 102 using one of the Braille displays 104 (e.g., Braille Display 104a). Alternatively, the teacher may control the host device 102 using other input devices such as a keyboard and mouse, and be presented with an image of a virtual Braille display on the display 108 of the host device 102.

In response to commands from the teacher, the host device 102 generates content 106 (shown for illustrative purposes on the display 108). The content 106 is the text "101 Tips for Surviving Advanced Calculus." While the content 106 is text, the content 106 can alternatively or additionally include other forms of content, including, but not limited to, images, multimedia content, and spoken content (including synthesized speech).

The host device 102 translates the content 106 to a Braille format and sends it to each of the Braille displays 104. The host device 102 sends the same content to each of the Braille displays; however, the host device 102 formats the content according to the display capabilities of each Braille display. For example, Braille display A 104a has a total of ten cells 110. In contrast, Braille display 104d has a total of only four cells 112. Thus, the host device would send ten characters at a time to Braille Display 104a, and would send only four characters at a time to Braille display 104d. If the host device 102 has more content than a Braille display 104 can display at one time, a user can use the buttons on the Braille display 104 to pan back and forth through the content.

In order to maintain order in the classroom, the teacher will likely want to be the only user who can control what content is presented to the students. Therefore, the host device 102 stores data indicating that the Braille display 104 associated with the teacher is the primary display, and only allows the primary display to change what content is presented by the host device. When the user does not use a physical Braille display, but instead is presented with a virtual Braille display on the display 108 of the host device as described above, the virtual Braille display can be considered the primary Braille display.

Collaborative Scenario

Figure 1B:
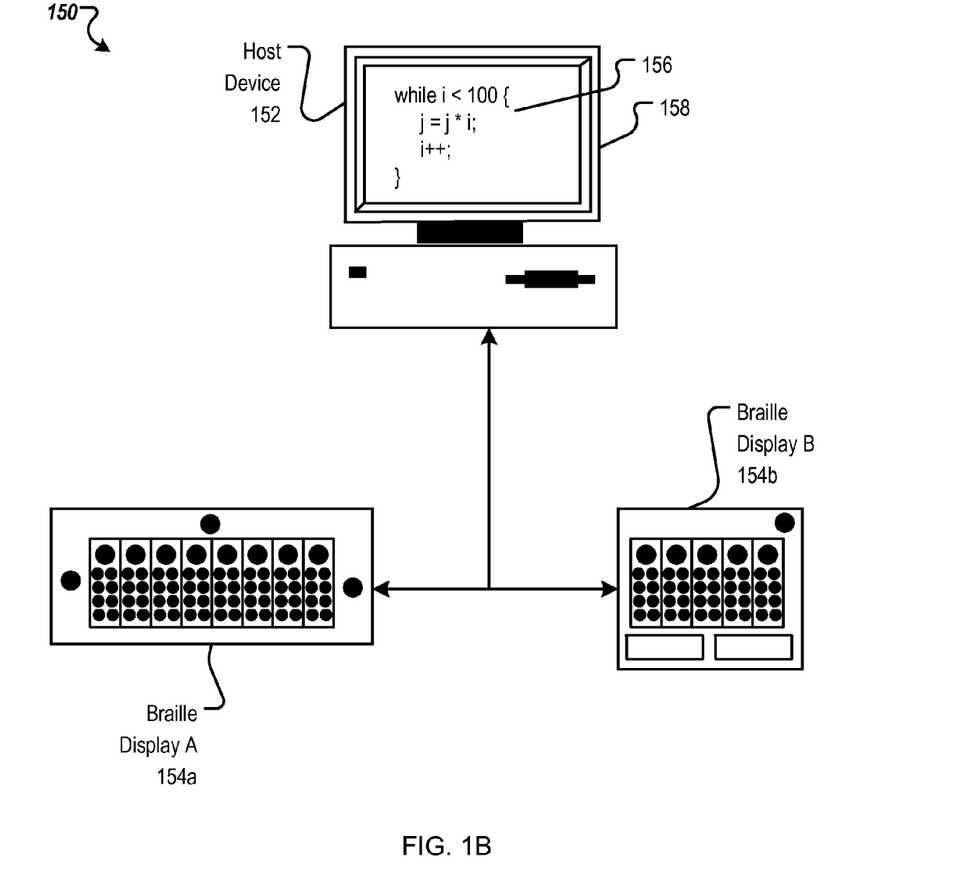

FIG. 1B illustrates an overview of another example system 150. The system 150 includes a host device 152 that is coupled to two Braille displays 154. While two Braille displays are shown in FIG. 1B, any number of Braille displays, including more than two and less than two, can be connected to the host device 102.

Users can use the Braille displays 154 to collaborate together on a project. In the system 150, the two users are collaborating on computer code 156 (shown for illustrative purposes on display 158). The host device 152 processes the code 156, converts it to Braille format, and sends it to each of the Braille displays 154, for example, as described above with reference to FIG. 1A. However, because the users are collaborating in this example, both users are able to control the computer using their respective Braille displays 154.

While the above example describes collaborating on computer code, many other collaboration scenarios are also possible, for example, working on a paper, reading content, and watching a movie.

Example Architecture of Braille Mirroring System

Figure 2:
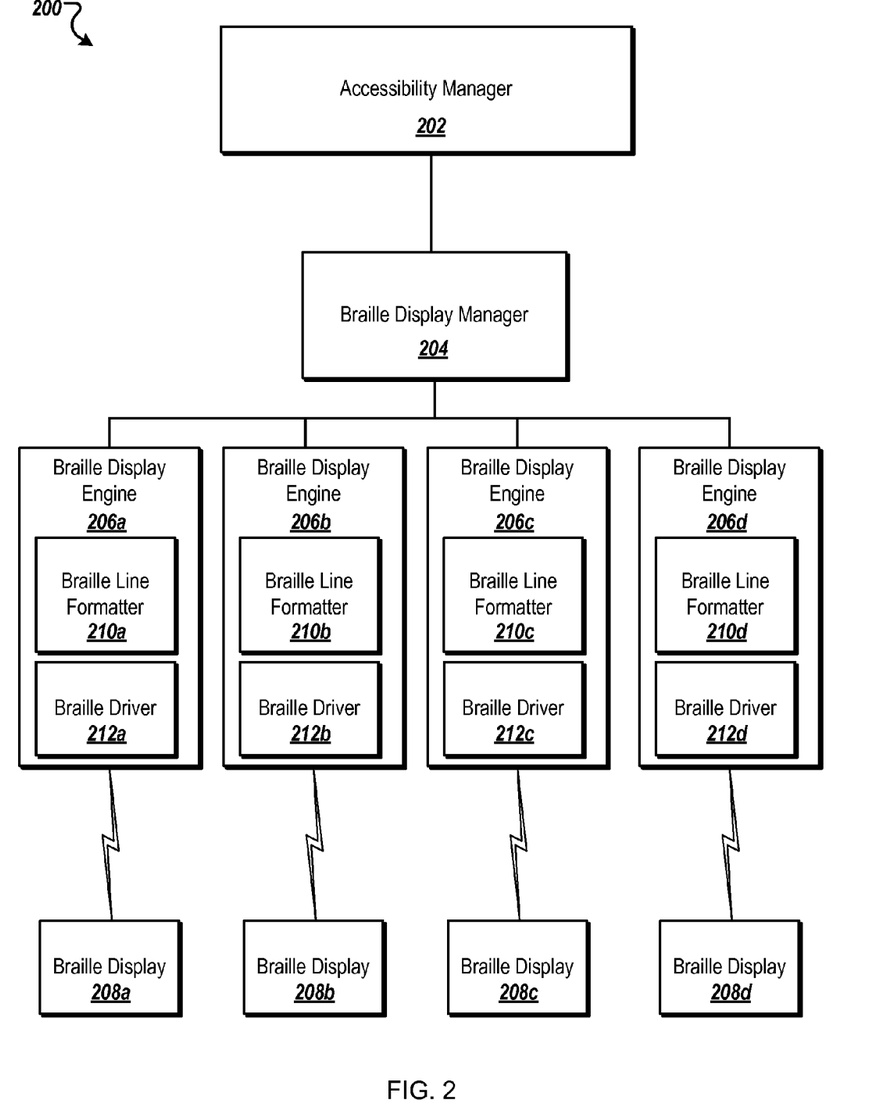
FIG. 2 illustrates an example architecture of a Braille mirroring system.

FIG. 2 illustrates an example architecture 200 of a Braille mirroring system. The Braille mirroring system provides the functionality described above with reference to FIGS. 1A and 1B. The architecture 200 includes an accessibility manager 202, a Braille display manager 204, and a number of Braille display engines 206. Each Braille display engine 206 provides formatted content to a corresponding Braille display 208. These components can be communicatively coupled to one or more of each other. Though the components identified above are described as being separate or distinct, two or more of the components may be combined in a single process or routine. The functional description provided herein including separation of responsibility for distinct functions is by way of example. Other groupings or other divisions of functional responsibilities can be made as necessary or in accordance with design preferences.

Sending Content to Braille Displays

The accessibility manager 202 manages the presentation of content by a host device. For example, the accessibility manager 202 can be a screen-reader program that converts content displayed on the display of a host device to a reference format. The reference format can be, for example, a text format such as a plain text format or a markup language text format (e.g., a Hypertext Markup Language (HTML) or Extensible Markup Language (XML) format). The accessibility manager 202 then sends the content to the Braille display manager 204 for presentation to the users. The accessibility manager 202 may also send the content to other display managers not shown, for example, an audio output manager that manages aural presentation of content. An example accessibility manager is VoiceOver, available from Apple Inc. of Cupertino, Calif.

The content sent to the Braille display manager can correspond to a location of a cursor that identifies a particular character or item of content on the screen. For example, the presented content can include all content on the same line as the cursor (e.g., both to the left and the right of the cursor).

The Braille display manager 204 manages the Braille display engines 206. As part of this management, the Braille display manager stores data identifying each of the Braille displays 208 coupled to the host device, as well as which Braille display engine 206 is providing content to each Braille display 208. The Braille display manager may also store data identifying one of the Braille displays as the primary display, for example, as described above with reference to FIG. 1A.

The Braille display manager 204 receives content formatted according to the reference format from the accessibility manager 202. The Braille display manager 204 converts the content into a Braille format, and stores the Braille content in a primary buffer. The Braille display manager converts the content into a Braille format, for example, by converting the characters in the content into their corresponding Braille characters. The Braille format can be contracted Braille or uncontracted Braille, for example, according to user preference. An example Braille format is Braille Ready File (BRF).

Once the content is converted to a Braille format, the Braille display manager 204 then provides the Braille content to each of the Braille display engines 206. This one-time conversion of the content (as opposed to having each Braille display engine 206 separately convert the content) results in increased efficiency. However, each Braille display engine 206 could alternatively perform its own conversion of the content.

The Braille manager may optionally store the content formatted according to the reference format. The Braille manager may also optionally store one or more history buffers of Braille content corresponding to content previously displayed by the host device. The Braille display manager uses the history buffers to optimize conversion of Braille content; for example, when the content being converted was recently displayed, the converted content can be retrieved from the history buffer instead of being regenerated. Alternatively, users can be allowed to review the history stored in the buffer.

In some implementations, the history buffer stores converted content corresponding to announcements. Announcements are additional information about the content that is provided to the user. For example, announcements can include help announcements that explain the content being presented and tell the user how to interact with the content. For example, if the user is currently being presented with content corresponding to a selectable button, the announcement might be Braille characters corresponding to the text, "You are currently on a button. Press Control, Option, Spacebar to activate this button." Users can then review their history when they need to be reminded how to interact with the content.

In some implementations, the Braille display manager 204 provides the Braille content to the accessibility manager 202. The accessibility manager can then cause a Braille representation of the content to be displayed on a display device of the host device, for example, on a virtual Braille display. The presentation can further include text captions corresponding to the Braille characters.

The Braille display manager 204 provides the Braille content to each of the Braille display engines 206. Each Braille display engine 206 includes a Braille line formatter 210 and a Braille driver 212. The Braille display engine 206 uses the Braille line formatter 210 to format the Braille content into a format that is appropriate for the Braille display 208 managed by the Braille display engine 206. The Braille display engine 206 uses the Braille driver 212 to send the formatted Braille content to the Braille display 208.

The Braille line formatter 210 receives the Braille content and formats it into a format appropriate for its corresponding Braille display. For example, different Braille displays 208 can have different numbers of cells. The Braille line formatter 210 can therefore format the Braille content so that only a given number of characters are sent to its corresponding Braille display 208, where the given number of characters corresponds to the number of cells on the Braille display 208. As another example, some Braille displays 208 have eight pins in each cell, and some Braille displays 208 have six pins in each cell. The Braille line formatter 210 can therefore format the Braille content so that the correct number of pins for the given Braille display 208 are used.

The Braille line formatter 210 can also select locations of line breaks. In some implementations, the Braille line formatter 210 selects line break locations to maximize the number of words that will fit on the display at any given time, without cutting off any characters of the words. For example, if the Braille line formatter 210 is given the Braille content "the quick brown fox" and is formatting it for a Braille display 208 with twelve characters, the Braille line formatter 210 splits the content into two lines: "the quick" and "brown fox." This can enhance readability for the user of the device. The Braille line formatter 210 can use various conventional optimization techniques to determine the optimal location of line breaks to maximize the number of words that fit on the display at any given time.

In some implementations, each Braille line formatter 210 also maintains a text-to-Braille mapping that is appropriate for its Braille display 208. Some Braille displays have router keys above each Braille cell. A user can use one of these keys to move the cursor to the character corresponding to the cell below the key. The text-to-Braille mapping maps each router key to the character of the content corresponding to the cell. This mapping can be used to process input received from the Braille display, as will be described below.

Each Braille driver 212 communicates with a corresponding Braille display 208 according to rules specific to the Braille display 208. Each Braille driver 212 sends commands to its corresponding Braille display 208 that instruct the Braille display 208 to present the characters identified by the Braille line formatter 210 in the format specified by the Braille line formatter 210. Each Braille driver 212 can also receive input from its corresponding Braille display 208, process the input, and provide the processed input to the Braille display manager 204.

Processing Input Received from Braille Displays

Users can use the buttons on the Braille displays 208 to request that the host device take certain actions. For example, users can request that content be panned or different content be displayed. As another example, users can use routing keys to request that the cursor be moved, or that an action associated with the cursor be taken. For example, if one of the routing keys corresponds to a selectable button in the content being displayed, the user can press the routing key once to request that the cursor be moved to the button, and press the routing key a second time to request that the button be selected.

Users can also use the buttons on the Braille displays 208 to enter Braille input and request that the host device take the action of processing the input. For example, Braille displays often contain six or eight buttons representing different Braille dots, and a button representing a spacebar, that a user can use to enter Braille input.

When one of the Braille drivers 212 receives input from its corresponding Braille display, the Braille driver 212 processes the input to identify the action being requested. When the input is from a routing key on the Braille display, the Braille line formatter 210 identifies the text character corresponding to the routing key using its text-to-Braille mapping described above.

In some implementations, whether the requested action is taken depends on what the action is, and whether the Braille display requesting the action is the primary Braille display. In these implementations, the Braille driver 212 forwards an identification of the action and an identification of the Braille display 208 requesting the action to the Braille display manager 204.

The Braille display manager 204 determines whether the Braille display 208 requesting the action is the primary Braille display, e.g., as indicated by the data stored by the Braille display manager 204. If so, the Braille display manager sends the request for action to the accessibility manager 202, which processes the request, and instructs the host device to take any appropriate action. The accessibility manager 202 can use conventional techniques to process the request.

If the Braille display 208 is not the primary Braille display, the Braille display manager 204 determines whether the requested action is a panning action (e.g., pan left or pan right). When the Braille display is presenting a sub-part of the content, the panning action requests that a different sub-part of the content be presented. If the requested action is a panning action, the Braille display manager 204 sends the request to the accessibility manager 202 along with an identification of the Braille display 208 that made the request. The accessibility manager 202 determines whether there are remaining, un-displayed, characters in the direction the user has requested that the host device pan. If so, the accessibility manger 202 instructs the Braille display manager 204 to have the appropriate Braille display engine 206 provide the next characters in the direction that the user has requested the host device pan. If not, the accessibility manager 202 takes no action.

If the Braille display 208 is not the primary Braille display and the action is not a panning action, the Braille display manager 204 takes no action.

In other implementations, the requested action is taken regardless of whether the requesting Braille display 208 is the primary Braille display. In these implementations, the Braille driver 212 forwards an identification of the requested action to the Braille display manager 204. The Braille display manager 204 then causes the action to be taken. This allows for collaboration between multiple users, for example, as described above with reference to FIG. 1B.

Example Content Management Processes

Presenting Braille Content

Figure 3:
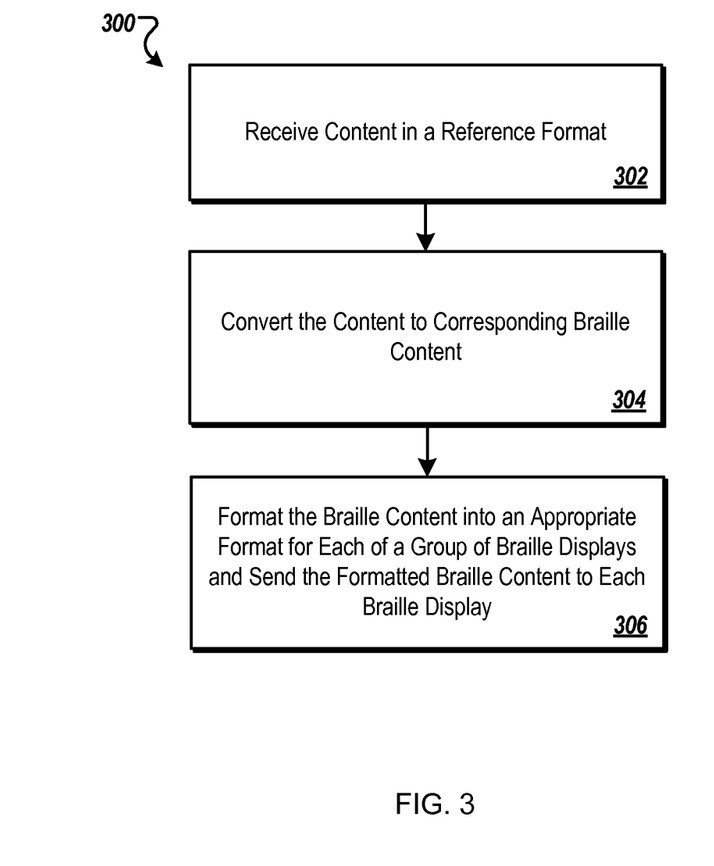
FIG. 3 is a flow diagram of an example process for providing Braille content to multiple Braille displays.

FIG. 3 is a flow diagram of an example process 300 for providing Braille content to multiple Braille displays. The process 300 is performed, for example, by a system such as the Braille mirroring system 200.

The system receives content in a reference format (302), for example, as described above with reference to FIG. 2. The system converts the content to corresponding Braille content (304), for example, as described above with reference to FIG. 2. The system then formats the Braille content into an appropriate format for each of a group of Braille displays, and sends the formatted Braille content to each Braille display (306), for example, as described above with reference to FIG. 2. For example, formatting the Braille content for a given Braille display can include formatting a number of characters of the content, where the number of characters is the same as the number of cells for the Braille display.

In some implementations, the system further stores data identifying one of the Braille displays as a primary display, and determines whether to respond to input received from a Braille display based, at least in part, on whether the Braille display is the primary Braille display, for example, as described above with reference to FIG. 2, and below with reference to FIG. 5.

Presenting Braille Content and Tracking the Primary Display

Figure 4:
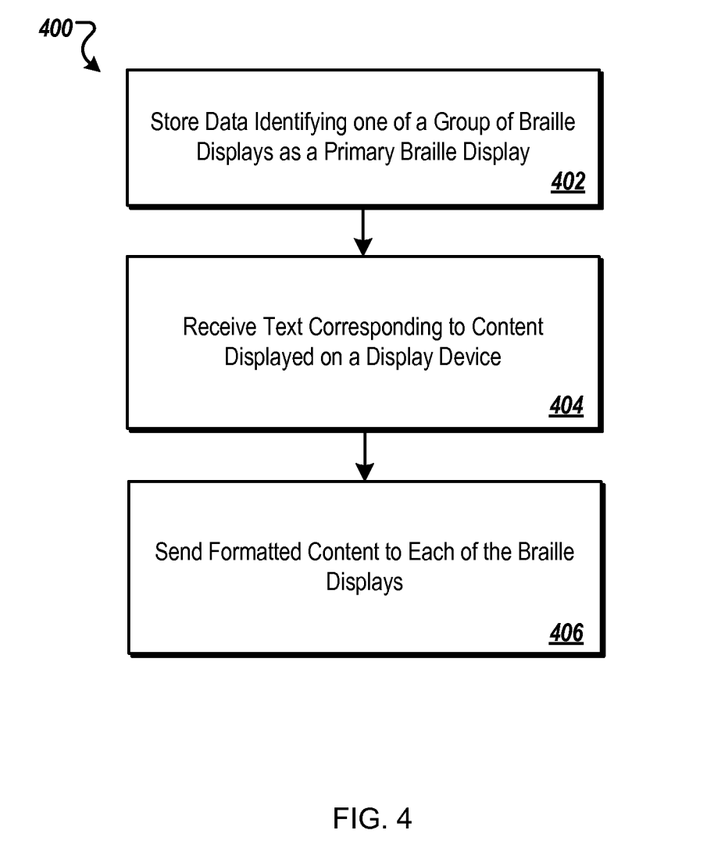
FIG. 4 is a flow diagram of an example process for presenting Braille content and tracking which Braille display is a primary display.

FIG. 4 is a flow diagram of an example process 400 for presenting Braille content and tracking which Braille display is a primary display. The process 400 is performed, for example, by a system such as the Braille mirroring system 200.

The system stores data identifying one of a group of Braille displays as a primary Braille display (402), for example, as described above with reference to FIG. 2. The system receives text corresponding to content displayed on a display device (404), for example, as described above with reference to FIG. 2. The system sends formatted content to each of the Braille displays (406), for example, as described above with reference to FIG. 2. In some implementations, the system further generates the Braille content corresponding to the first text, for example, as described above with reference to FIG. 2.

The system can repeat the receiving and sending steps as necessary when the content presented by the data processing apparatus changes. In some implementations, when the system receives input from the primary Braille display, the content presented by the data processing apparatus changes, and the system sends new formatted Braille content to each of the Braille displays in response to the input.

The system can also receive input indicating that a different Braille display should be the primary Braille display, and update the data that is stored so that the old primary Braille display is no longer designated as a primary Braille display and the different Braille display is designated as the primary Braille display.

Processing Input Received from a Braille Display

Figure 5:
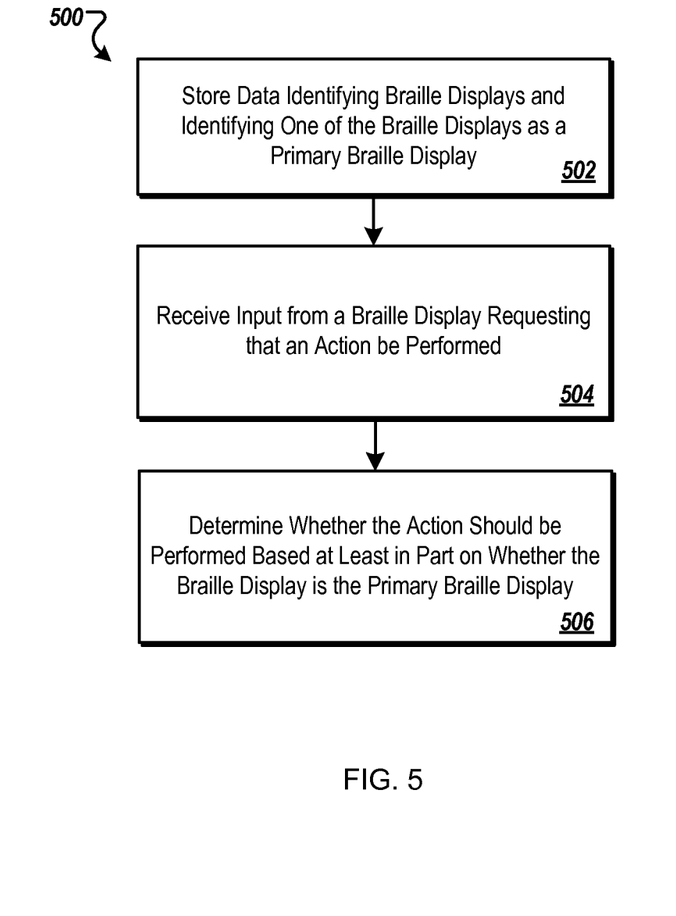
FIG. 5 is a flow diagram of an example process for processing input received from a Braille display.

FIG. 5 is a flow diagram of an example process 500 for processing input received from a Braille display. The process is performed, for example, by a system, for example, the system 200.

The system stores data identifying Braille displays and identifying one of the Braille displays as a primary Braille display (502), for example, as described above with reference to FIG. 2. The system receives input from a Braille display requesting that an action be performed (504), for example, as described above with reference to FIG. 2. The system determines whether the action should be performed based at least in part on whether the Braille display is the primary Braille display (506), for example, as described above with reference to FIG. 2.

When the system determines that the action should be taken, the system can further take the action requested by the Braille display.

In some implementations, the system determines that the Braille display is the primary Braille display, and then determines that the action should be taken. In some implementations, the system determines that the display is not the primary display, and that the action should not be taken. In some implementations, the input requests that the data processing apparatus pan the content, the system determines that the Braille display is not the primary Braille display, and the system determines that the panned content should be sent to the Braille display, for example, as described above with reference to FIG. 2.

The system can also receive input indicating that a different Braille display should be the primary Braille display, and update the primary Braille display data accordingly.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be coupled by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, in a data processing apparatus, content in a reference format;
converting, with the data processing apparatus, the content into corresponding Braille content having an intermediate Braille format; and
for each of a plurality of Braille displays, formatting, with the data processing apparatus, the Braille content from the intermediate format into a specific format for that Braille display, and sending the specifically formatted Braille content to the Braille display, wherein at least two of the Braille displays have different specific formats,
wherein the data processing apparatus causes the specifically formatted Braille content to be simultaneously presented by each of the plurality of Braille displays; and
storing a history buffer of previous Braille content sent to the plurality of Braille displays.

2. The method of claim 1, wherein the reference format is selected from the group consisting of Hypertext Markup Language and Extensible Markup Language.

3. The method of claim 1, wherein the intermediate Braille format is Braille Ready File.

4. The method of claim 1, wherein:
each of the plurality of Braille displays have a respective number of cells; and
formatting the Braille content from the intermediate format into the specific format for each Braille display includes formatting a number of characters of the Braille content corresponding to the respective number of cells for the Braille display.

5. The method of claim 1, further comprising:
storing data identifying one of the plurality of Braille displays as a primary display; and
determining whether to respond to input received from a first Braille display based, at least in part, on whether the first Braille display is the primary Braille display.

6. A system comprising:
a plurality of Braille displays;
an accessibility module operable to perform operations comprising:
receiving content for presentation;
converting the received content to content in a reference format; and
sending the content in the reference format to a Braille display manager;
a Braille display manager operable to perform operations comprising:
receiving the content in the reference format from the accessibility module;
converting the content in the reference format into Braille content having an intermediate Braille format; and
managing each of a plurality of Braille display engines;
a plurality of Braille display engines, each engine corresponding to a respective Braille display in the plurality of Braille displays, each engine operable to perform operations comprising:
receiving the Braille content from the Braille display manager;
formatting the Braille content from the intermediate Braille format into a specific format for the Braille display corresponding to the engine;
providing the specifically formatted Braille content to the Braille display
wherein the Braille display manager causes the formatted Braille content to be simultaneously presented by each of the plurality of Braille displays; and storing a history buffer of previous Braille content sent to the plurality of Braille displays.

7. The system of claim 6, wherein the Braille display manager is further operable to perform operations comprising:
storing data identifying one of the plurality of Braille display as a primary Braille display; and
determining whether to respond to input received from a first Braille display based, at least in part, on whether the first Braille display is the primary Braille display.

8. A non-transitory computer storage medium encoded with a computer program, the computer program including instructions, that when executed by data processing apparatus, cause the data processing apparatus to perform operations comprising:
receiving content in a reference format;
converting the content in the reference format into corresponding Braille content having an intermediate Braille format; and
for each of a plurality of Braille displays, formatting the Braille content from the intermediate format into a specific format for that Braille display, and sending the specifically formatted content to the Braille display, wherein at least two of the Braille displays have different specific formats,
wherein the sending causes the formatted Braille content to be simultaneously presented by each of the plurality of Braille displays and; and storing a history buffer of previous Braille content sent to the plurality of Braille displays.

9. A computer-implemented method, comprising:
storing, in a data processing apparatus, data identifying one of a plurality of Braille displays coupled to the data processing apparatus as a primary Braille display;
receiving, in the data processing apparatus, first text corresponding to first content displayed on a display device of the data processing apparatus; and
sending, with the data processing apparatus, first formatted Braille content to each of the plurality of Braille displays, wherein the first formatted Braille content sent to each display corresponds to the first text and is formatted according to a format appropriate for the display and the first text is converted into an intermediate format Braille content before being converted into the first formatted content,
wherein the data processing apparatus causes the formatted Braille content to be simultaneously presented by each of the plurality of Braille displays; and
storing a history buffer of previous Braille content sent to the plurality of Braille displays.

10. The method of claim 8, further comprising:
receiving input from a first Braille display in the plurality of Braille displays, the input requesting that the data processing apparatus perform a first action; and
determining whether to perform the first action based at least in part on whether the first Braille display is the primary Braille display.

11. The method of claim 9, further comprising receiving input from the primary Braille display, and in response to the input, sending new formatted Braille content to each of the plurality of Braille displays.

12. The method of claim 9, further comprising:
receiving second text corresponding to second content displayed on the display device; and
sending, with the data processing apparatus, second formatted Braille content to each of the plurality of Braille displays, wherein the second formatted Braille content sent to each display corresponds to the second text and is formatted according to a format appropriate for the display.

13. The method of claim 9, further comprising:
receiving an input indicating that a different Braille display in the plurality of Braille displays should be the primary Braille display; and
updating the stored data to identify the different Braille display as the primary Braille display.

* * * * *